(12) United States Patent
Yang et al.

(10) Patent No.: US 10,890,647 B2
(45) Date of Patent: Jan. 12, 2021

(54) FORWARD ACOUSTIC SCATTERING BASED DOUBLE-TRANSMITTER AND DOUBLE-RECEIVER NETWORKING TARGET DETECTION SYSTEM AND METHOD THEREOF

(71) Applicant: Northwestern Polytechnical University, Xi'an (CN)

(72) Inventors: Kunde Yang, Xi'an (CN); Chuanlin He, Xi'an (CN); Yuanliang Ma, Xi'an (CN); Bo Lei, Xi'an (CN)

(73) Assignee: Northwestern Polytechnical University, Xi'an (CN)

( * ) Notice: Subject to any disclaimer, the term of this patent is extended or adjusted under 35 U.S.C. 154(b) by 557 days.

(21) Appl. No.: 15/816,610

(22) Filed: Nov. 17, 2017

(65) Prior Publication Data

US 2018/0143293 A1 May 24, 2018

(30) Foreign Application Priority Data

Nov. 18, 2016 (CN) .......................... 2016 1 1013419

(51) Int. Cl.
*G01S 5/30* (2006.01)
*G01S 11/14* (2006.01)
*G01V 1/00* (2006.01)
*G08B 13/16* (2006.01)

(52) U.S. Cl.
CPC ................. *G01S 5/30* (2013.01); *G01S 11/14* (2013.01); *G01V 1/001* (2013.01); *G08B 13/1618* (2013.01); *G08B 13/1609* (2013.01)

(58) Field of Classification Search
CPC ........... G01S 5/30; G01S 11/14; G01V 1/001; G08B 13/1618; G08B 13/1609
See application file for complete search history.

(56) References Cited

U.S. PATENT DOCUMENTS

| 2006/0145024 A1* | 7/2006 | Kosmas | ................ | B64G 1/285 |
| | | | | 244/172.5 |
| 2008/0144442 A1* | 6/2008 | Combee | ................... | G01V 1/38 |
| | | | | 367/131 |

(Continued)

*Primary Examiner* — Hovhannes Baghdasaryan
*Assistant Examiner* — Amie M Ndure
(74) *Attorney, Agent, or Firm* — Wayne & Ken, LLC; Tony Hom

(57) ABSTRACT

The present invention relates to a forward acoustic scattering based double-transmitter and double-receiver networking target detection system and method thereof. Two transmitting ends and two receiving ends are adopted, anchored at a sea bottom, and arranged in a parallelogram layout. Time of a target crossing transmitting-receiving connection lines is extracted by adopting a proper direct wave suppression method; and unknown parameters of the horizontal distance, the target velocity and the included angle between the target track and the transmitting-receiving connection lines are estimated at corresponding moving time intervals when the target crosses the four transmitting-receiving connection lines according to different crossing modes. An arrangement mode is simple and flexible, and monitoring of sea areas and sea channels can be realized. The information of the time of the target crossing the transmitting-receiving connection lines, extracted by the method, is more accurate and reliable.

2 Claims, 4 Drawing Sheets

(56) References Cited

U.S. PATENT DOCUMENTS

| | | | | |
|---|---|---|---|---|
| 2013/0266380 A1* | 10/2013 | Capron | .............. | E21B 41/0064<br>405/184.4 |
| 2015/0293213 A1* | 10/2015 | Felber | .................... | G01S 15/04<br>367/3 |

* cited by examiner

FORWARD ACOUSTIC SCATTERING BASED DOUBLE-TRANSMITTER AND DOUBLE-RECEIVER NETWORKING TARGET DETECTION SYSTEM AND METHOD THEREOF

FIELD OF THE INVENTION

The present invention belongs to range measurement methods of underwater targets, and relates to a forward acoustic scattering based double-transmitter and double-receiver networking target detection system and method thereof. The present invention can be used for detecting underwater moving targets that intrude into double-base transmitting-receiving connection lines, can realize range measurement, direction measurement and velocity measurement of the targets, and can be applicable to double-transmitter double-receiver and multi-transmitter multi-receiver detection cases, wherein a transmitting end may refer to a single transducer or a transmitting array; and a receiving end may refer to a single hydrophone or a receiving array. The present invention belongs to the fields of underwater sound engineering, ocean engineering, sonar technologies, etc.

BACKGROUND OF THE INVENTION

Forward acoustic scattering is mainly used for detecting underwater invading targets which are close to transmitting-receiving connection lines or which cross the transmitting-receiving connection lines. In this case, since forward scattering intensity of the targets is greater than intensity in a reverse direction and other directions, a forward scattering wave and a direct wave which arrive at receiving ends interfere with each other and enable a receiving sound field to fluctuate. After direct wave suppression, distortion of the forward scattering wave or the receiving sound field can be extracted.

When the position of the target is close to the transmitting-receiving connection lines, the range resolution of the detection system for the target is infinite. Even if a forward scattering signal of the target can be extracted through a direct wave suppression method, distance information of the invading target cannot be extracted from the forward scattering signal. Therefore, in a forward acoustic scattering based target detection system under a single-transmitter single-receiver configuration, range measurement cannot be performed for the target and velocity and course information of the target cannot be known.

In published literature data, the distance information of the target that invades into the transmitting-receiving connection lines is extracted in a single-transmitter double-receiver configuration mode. In this configuration condition, two transmitting-receiving connection lines exist. It is assumed that a length of the transmitting-receiving connection lines is l, a spacing of two hydrophones is h and h is greatly less than l. A horizontal distance from a crossing point of the target on the transmitting-receiving connection line to the transmitting end is marked as d, and it is assumed that the moving velocity v of the target is a known quantity. Time of the target crossing two transmitting-receiving connection lines are measured as $t_1$ and $t_2$, and then a course of the target between the two transmitting-receiving connection lines can be indicated as $v(t_2-t_1)$. According to a triangle similarity relationship, $d=v(t_2-t_1)\,l/h$ can be directly obtained. Crossing time $t_1$ and $t_2$ can be extracted through an extraction method of sound field distortion, and substituted into a formula to obtain estimated values about the target distance.

However, in practical application, the method has two obvious defects: 1. the moving velocity information of the target in practical application belongs to an unknown quantity and cannot be known in advance. 2. The method for extracting the crossing time of the target by directly observing sound field fluctuation is not reliable. Therefore, in practical application, the method for extracting the distance information of the moving target that crosses the transmitting-receiving connection lines in a single-transmitter multi-receiver mode is infeasible.

SUMMARY OF THE INVENTION

The present invention proposes a forward acoustic scattering based double-transmitter double-receiver networking target detection system and method thereof to avoid defects of the prior art, which can be applicable to double-transmitter double-receiver and multi-transmitter multi-receiver detection cases. The present invention can be used for detecting underwater moving targets that intrude into transmitting-receiving connection lines, and can realize range measurement, direction measurement and velocity measurement of the targets.

A forward acoustic scattering based double-transmitter double-receiver networking type target detection system comprises two transmitting ends and two receiving ends, wherein the two transmitting ends and the two receiving ends are anchored at a sea bottom, and formed in a parallelogram layout; the two transmitting ends are respectively marked as $T_{x1}$ and $T_{x2}$; the two receiving ends are respectively marked as $R_{x1}$ and $R_{x2}$; $T_{x1}$-$R_{x1}$, $R_{x1}$-$R_{x2}$, $R_{x2}$-$T_{x2}$ and $T_{x2}$-$T_{x1}$ form four edges of the parallelogram; $T_{x1}$-$R_{x2}$ and $T_{x2}$-$R_{x1}$ are two diagonal lines of the parallelogram; a length of $T_{x1}$-$R_{x1}$ is marked as l; a length of $R_{x1}$-$R_{x2}$ is marked as h; an included angle between $T_{x1}$-$T_{x2}$ and $T_{x2}$-$R_{x2}$ is marked as α; and four transmitting-receiving connection lines are formed: $T_{x1}$-$R_{x1}$, $T_{x1}$-$R_{x2}$, $T_{x2}$-$R_{x1}$ and $T_{x2}$-$R_{x2}$; and depths of the transmitting ends and the receiving ends are equal.

The number of transmitting sound sources of the transmitting ends is in a range of 2-50; the number of receiving hydrophone arrays is in a range of 2-50; and a multi-transmitter multi-receiver forward detection system is formed.

A spacing of the transmitting sound sources is 10-10000 meters.

A spacing of the receiving hydrophone arrays is 10-10000 meters.

A method for detection by using the forward acoustic scattering based double-transmitter and double-receiver networking target detection system comprises the following steps of estimating unknown parameters of d, v and γ when a target successively crosses $T_{x1}$-$R_{x1}$, $T_{x2}$-$R_{x1}$, $T_{x1}$-$R_{x2}$ and $T_{x2}$-$R_{x2}$ at uniform velocity v along a straight line, with a horizontal distance from a crossing point of the target on the transmitting-receiving connection line $T_{x1}$-$R_{x1}$ to $R_{x1}$ marked as d and an included angle between a target track and the transmitting-receiving connection line $T_{x1}$-$R_{x1}$ marked as γ:

step 1: extracting time of the target crossing transmitting-receiving connection lines by adopting a direct wave suppression method, wherein since four transmitting-receiving connection lines exist under a double-transmitter double-receiver configuration, four time are successively marked as $t_1$, $t_2$, $t_3$ and $t_4$ according to a time sequence;

step 2: calculating corresponding moving time intervals when the target crosses the four transmitting-receiving connection lines as $\Delta t_{21}=t_2-t_1$, $\Delta t_{32}=t_3-t_2$ and $\Delta t_{43}=t_4-t_3$;

step 3: substituting parameters of $\Delta t_{21}$, $\Delta t_{32}$, $\Delta t_{43}$ and l into the following formula to obtain an estimated value of a target distance d:

$$d = \frac{\Delta t_{21}(\Delta t_{21} + \Delta t_{32} - \Delta t_{43})}{\Delta t_{32}(\Delta t_{21} + \Delta t_{32} + \Delta t_{43})}l$$

wherein l is a length of $T_{x1}$-$R_{x1}$;

step 4: substituting parameters of $\Delta t_{21}$, $\Delta t_{32}$, $\Delta t_{43}$, l, h and α into the following formula to obtain an estimated value of an inclined angle α of a target track:

$$\gamma = \tan^{-1}\left(\frac{1}{\frac{l}{h\sin\alpha}\frac{\Delta t_{21}-\Delta t_{43}}{\Delta t_{32}}-\frac{1}{\tan\alpha}}\right)$$

wherein h is a length of $R_{x1}$-$R_{x2}$ and α is an included angle between $T_{x1}$-$T_{x2}$ and $T_{x2}$-$R_{x2}$; and step 5: substituting parameters of $\Delta t_{21}$, $\Delta t_{32}$, $\Delta t_{43}$, l, h and α into the following formula to obtain an estimated value of a moving velocity v of the target:

$$v = \frac{\sqrt{h^2\Delta t_{32}^2\sin^2\alpha + [l(\Delta t_{21}-\Delta t_{43})-h\Delta t_{32}\cos\alpha]^2}}{\Delta t_{32}(\Delta t_{21}+\Delta t_{32}+\Delta t_{43})}$$

A method for detection by using the forward acoustic scattering based double-transmitter and double-receiver networking target detection system comprises the following steps of estimating unknown parameters of d, v and γ when a target successively crosses $T_{x1}$-$R_{x1}$, $T_{x1}$-$R_{x2}$, $T_{x2}$-$R_{x1}$ and $T_{x2}$-$R_{x2}$ at uniform velocity v along a straight line, with a horizontal distance from a crossing point of the target on the transmitting-receiving connection line $T_{x1}$-$R_{x1}$ to $R_{x1}$ marked as d and an included angle between a target track and the transmitting-receiving connection line $T_{x1}$-$R_{x1}$ marked as γ;

step 1: extracting time of the target crossing transmitting-receiving connection lines by adopting a direct wave suppression method, wherein since four transmitting-receiving connection lines exist under a double-transmitter double-receiver configuration, four time are successively marked as $t_1$, $t_2$, $t_3$ and $t_4$ according to a time sequence;

step 2: calculating corresponding moving time intervals when the target crosses the four transmitting-receiving connection lines as $\Delta t_{21}=t_2-t_1$, $\Delta t_{32}=t_3-t_2$ and $\Delta t_{43}=t_4-t_3$;

step 3: substituting parameters of $\Delta t_{21}$, $\Delta t_{32}$, $\Delta t_{43}$ and l into the following formula to obtain an estimated value of a target distance d:

$$d = -\frac{(\Delta t_{21}+\Delta t_{32})(\Delta t_{21}-\Delta t_{32}-\Delta t_{43})}{\Delta t_{32}(\Delta t_{21}+\Delta t_{32}+\Delta t_{43})}l$$

wherein l is a length of $T_{x1}$-$R_{x1}$;

step 4: substituting parameters of $\Delta t_{21}$, $\Delta t_{32}$, $\Delta t_{43}$, l, h and a into the following formula to obtain an estimated value of an inclined angle α of a target track:

$$\gamma = \tan^{-1}\left(\frac{1}{\frac{l}{h\sin\alpha}\frac{\Delta t_{43}-\Delta t_{21}}{\Delta t_{32}}-\frac{1}{\tan\alpha}}\right)$$

wherein h is a length of $R_{x1}$-$R_{x2}$ and α is an included angle between $T_{x1}$-$T_{x2}$ and $T_{x2}$-$R_{x2}$; and step 5: substituting parameters of $\Delta t_{21}$, $\Delta t_{32}$, $\Delta t_{43}$, l, h and α into the following formula to obtain an estimated value of a moving velocity v of the target:

$$v = \frac{\sqrt{h^2\Delta t_{32}^2\sin^2\alpha + [l(\Delta t_{43}-\Delta t_{21})-h\Delta t_{32}\cos\alpha]^2}}{\Delta t_{32}(\Delta t_{21}+\Delta t_{32}+\Delta t_{43})}.$$

The present invention proposes a forward acoustic scattering based double-transmitter double-receiver networking target detection system and method thereof. Two transmitting ends and two receiving ends are adopted, anchored at a sea bottom, and arranged in a layout of a parallelogram. Time of a target crossing transmitting-receiving connection lines are extracted by adopting a proper direct wave suppression method; and unknown parameters of the horizontal distance, the target velocity and the included angle between the target track and the transmitting-receiving connection lines are estimated at corresponding moving time intervals when the target crosses the four transmitting-receiving connection lines according to different crossing modes.

The present invention has the beneficial effects that:

(1) An arrangement mode is simple and flexible, and quick monitoring of some important sea areas and sea channels can be realized. The transmitting ends and the receiving ends are anchored at the sea bottom, and respective position coordinates can be obtained through GPS. Thus, information of the arrangement form, distance, angle and the like can also be easily calculated.

(2) Required parameters are only information of moving time of the target through a geometrical relationship between a receiving configuration and a transmitting configuration. The information of the distance, the velocity, the inclined angle of the track and the like of the target can be simultaneously estimated by combining the information of the moving time of the target with layout parameters.

(3) After a direct wave suppression method based on adaptive interference cancellation is applied, a direct wave is inhibited to an output background and a sound field distortion caused by that the target crosses the transmitting-receiving connection lines is represented by an output peak value. The information of the time of the target crossing the transmitting-receiving connection lines, extracted by the method, are more accurate and reliable.

DESCRIPTION OF THE DRAWINGS

FIG. 1 shows a schematic diagram of a forward acoustic scattering based double-transmitter double-receiver detection network (parallelogram layout-crossing case 2);

DETAILED DESCRIPTION OF THE INVENTION

The present invention is further described in combination with embodiments and drawings.

A target detection system comprises two transmitting ends and two receiving ends; the two transmitting ends and the two receiving ends are anchored at a sea bottom, and formed in a parallelogram layout; the two transmitting ends are respectively marked as $T_{x1}$ and $T_{x2}$; the two receiving ends are respectively marked as $R_{x1}$ and $R_{x2}$; $T_{x1}$-$R_{x1}$, $R_{x1}$-$R_{x2}$, $R_{x2}$-$T_{x2}$ and $T_{x2}$-$T_{x1}$ form four edges of the parallelogram; $T_{x1}$-$R_{x2}$ and $T_{x2}$-$R_{x1}$ are two diagonal lines of the parallelogram; a length of $T_{x1}$-$R_{x1}$ is marked as l; a length of $R_{x1}$-$R_{x2}$ is marked as h; an included angle between $T_{x1}$-$T_{x2}$ and $T_{x2}$-$R_{x2}$ is marked as $\alpha$; formed four transmitting-receiving connection lines are: $T_{x1}$-$R_{x1}$, $T_{x1}$-$R_{x2}$, $T_{x2}$-$R_{x1}$ and $T_{x2}$-$R_{x2}$; and depths of the transmitting ends and the receiving ends are equal.

Firstly, derivation processes of estimation formulas of a target distance d, a moving velocity v and a track angle $\gamma$ are given.

Figure 1:
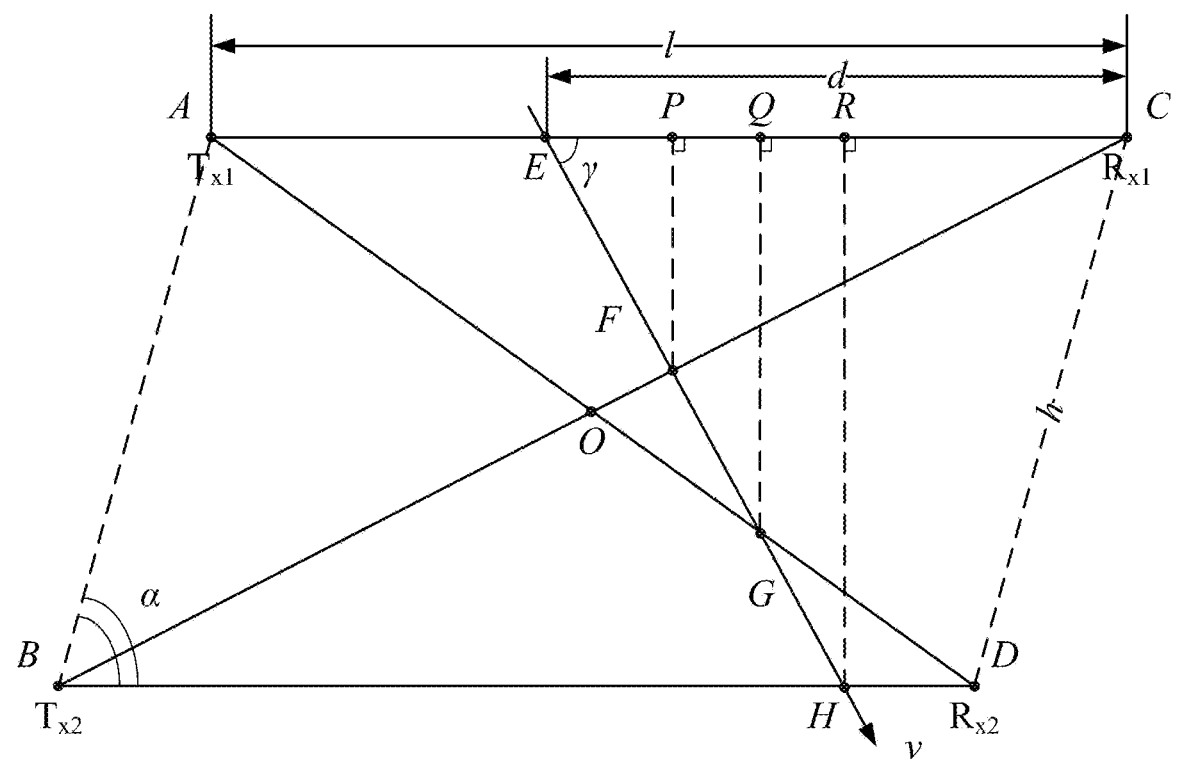
FIG. 1 shows a schematic diagram of a forward acoustic scattering based double-transmitter double-receiver detection network (parallelogram layout-crossing case 1)

In FIG. 1, two transmitting ends $T_{x1}$ and $T_{x2}$ are respectively located at A point and B point; and two receiving ends $R_{x1}$ and $R_{x2}$ are respectively located at C point and D point. Positions and connection lines of the transmitting ends and the receiving ends form a parallelogram, wherein |AC|=l, |CD|=h, and an included angle between AB and BD is marked as $\alpha$. In this way, four transmitting-receiving connection lines are formed: $AC(T_{x1}$-$R_{x1})$, $BC(T_{x1}$-$R_{x2})$, $AD(T_{x1}$-$R_{x2})$ and BD $(T_{x2}$-$R_{x2})$.

The target successively crosses the four transmitting-receiving connection lines of AC, BC, AD and BD at a constant velocity v along a straight track, and crossing points of the target and the four transmitting-receiving connection lines are marked as E, F, G and H. A horizontal distance from the crossing point E of the target on AC to the crossing point C ($R_{x1}$) is marked as d, and an included angle between the target track and AC is marked as $\gamma$. Vertical lines are respectively made to AC from three crossing points F, G and H, and crossed at P point, Q point and R point.

According to a triangle similarity relationship: $\triangle CFE111\square\triangle BFH$, a formula is obtained $$|BH| = \frac{\Delta t_{32} + \Delta t_{43}}{\Delta t_{21}} d. \quad (1)$$

According to a triangle similarity relationship: $\triangle AGE\square\triangle DGH$, a formula is obtained $$|DH| = \frac{\Delta t_{43}}{\Delta t_{21} + \Delta t_{32}}(l - d). \quad (2)$$

Since |BH|+|DH|=l, formula (1) and formula (2) are substituted into the formula to obtain $$d = \frac{\Delta t_{21}(\Delta t_{21} + \Delta t_{32} - \Delta t_{43})}{\Delta t_{32}(\Delta t_{21} + \Delta t_{32} + \Delta t_{43})} l. \quad (3)$$

In a right triangle $\triangle EHR$, $|ER|=h \sin \alpha/\tan \gamma$, and substituted into $|ER|+|DH|+h \cos \alpha=d$ to obtain $$\gamma = \tan^{-1}\left(\frac{1}{\frac{l}{h\sin\alpha}\frac{\Delta t_{21} - \Delta t_{43}}{\Delta t_{32}} - \frac{1}{\tan\alpha}}\right). \quad (4)$$

In a right triangle $\triangle EHR$, $$|EH|^2 = |HR|^2\left(1 + \frac{1}{\tan^2\gamma}\right). \quad (5)$$

Formula (4) is substituted into formula (5) to obtain $$|EH| = \frac{1}{\Delta t_{32}}\sqrt{\Delta t_{32}^2 h^2 \sin^2\alpha + [l(\Delta t_{21} - \Delta t_{43}) - h\Delta t_{32}\cos\alpha]^2}. \quad (6)$$

Since $|EH| = v(\Delta t_{21} + \Delta t_{32} + \Delta t_{43})$, then $$v = \frac{\sqrt{\Delta t_{32}^2 h^2 \sin^2\alpha + [l(\Delta t_{21} - \Delta t_{43}) - h\Delta t_{32}\cos\alpha]^2}}{\Delta t_{32}(\Delta t_{21} + \Delta t_{32} + \Delta t_{43})}. \quad (7)$$

Figure 2:
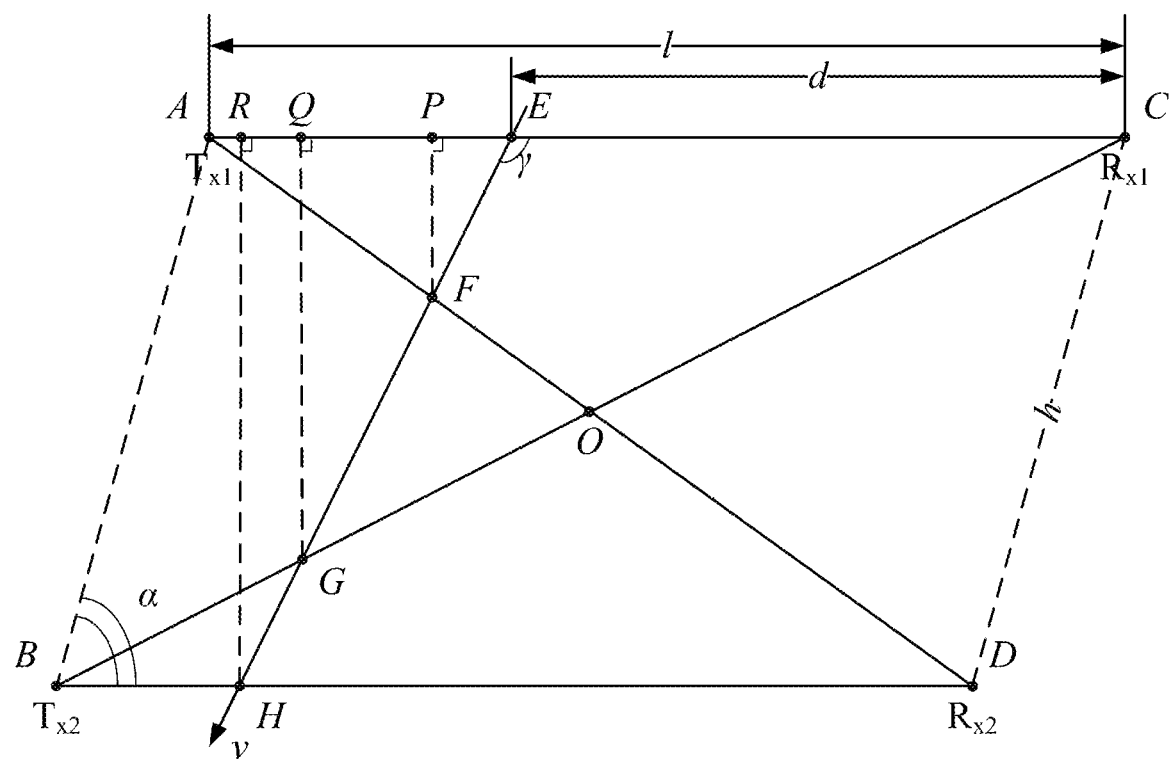

In FIG. 2, two transmitting ends $T_{x1}$ and $T_{x2}$ are respectively located at A point and B point; and two receiving ends $R_{x1}$ and $R_{x2}$ are respectively located at C point and D point. Positions and connection lines of the transmitting ends and the receiving ends form a parallelogram, wherein |AC|=l, |CD|=h, and an included angle between AB and BD is marked as a. In this way, four transmitting-receiving connection lines are formed: $AC(T_{x1}$-$R_{x1})$, $BC(T_{x1}$-$R_{x2})$, $AD(T_{x1}$-$R_{x2})$ and BD $(T_{x2}$-$R_{x2})$.

The target successively crosses the four transmitting-receiving connection lines of AC, AD, BC and BD at a constant velocity v along a straight track, and crossing points of the target and the four transmitting-receiving connection lines are marked as E, F, G and H. A horizontal distance from the crossing point E of the target on AC to the crossing point C ($R_{x1}$) is marked as d, and an included angle between the target track and AC is marked as $\gamma$. Vertical lines are respectively made to AC from three crossing points F, G and H, and crossed at P point, Q point and R point.

According to a triangle similarity relationship: $\triangle AFE\square\triangle DFH$, a formula is obtained $$|DH| = \frac{\Delta t_{32} + \Delta t_{43}}{\Delta t_{21}}(l - d). \quad (8)$$

According to a triangle similarity relationship: $\triangle CGE\square\triangle BGH$, a formula is obtained $$|BH| = \frac{\Delta t_{43}}{\Delta t_{21} + \Delta t_{32}} d. \quad (9)$$

Since |BH|+|DH|=l, formula (8) and formula (9) are substituted into the formula to obtain $$d = -\frac{(\Delta t_{21} + \Delta t_{32})(\Delta t_{21} - \Delta t_{32} - \Delta t_{43})}{\Delta t_{32}(\Delta t_{21} + \Delta t_{32} + \Delta t_{43})} l. \quad (10)$$

In a right triangle $\Delta EHR$, $|ER|=h\sin\alpha/\tan(\pi-\gamma)$ and substituted into $|BH|=h\cos\alpha+|ER|=l-d$ to obtain $$\gamma = \tan^{-1}\left(\cfrac{1}{\cfrac{\Delta t_{43}-\Delta t_{21}}{\Delta t_{32}}\cfrac{l}{h\sin\alpha}-\cfrac{1}{\tan\alpha}}\right). \quad (11)$$

In a right triangle $\Delta EHR$, $$|EH|^2 = |HR|^2\left(1+\frac{1}{\tan^2\gamma}\right). \quad (12)$$

Formula (11) is substituted into formula (12) to obtain $$|EH| = \frac{1}{\Delta t_{32}}\sqrt{\Delta t_{32}^2 h^2\sin^2\alpha + [l(\Delta t_{43}-\Delta t_{21})-h\Delta t_{32}\cos\alpha]^2}. \quad (13)$$

Since $|EH| = v(\Delta t21 + \Delta t32 + \Delta t43)$, then $$v = \frac{\sqrt{\Delta t_{32}^2 h^2\sin^2\alpha + [l(\Delta t_{43}-\Delta t_{21})-h\Delta t_{32}\cos\alpha]^2}}{\Delta t_{32}(\Delta t_{21}+\Delta t_{32}+\Delta t_{43})}. \quad (14)$$

Figure 3:
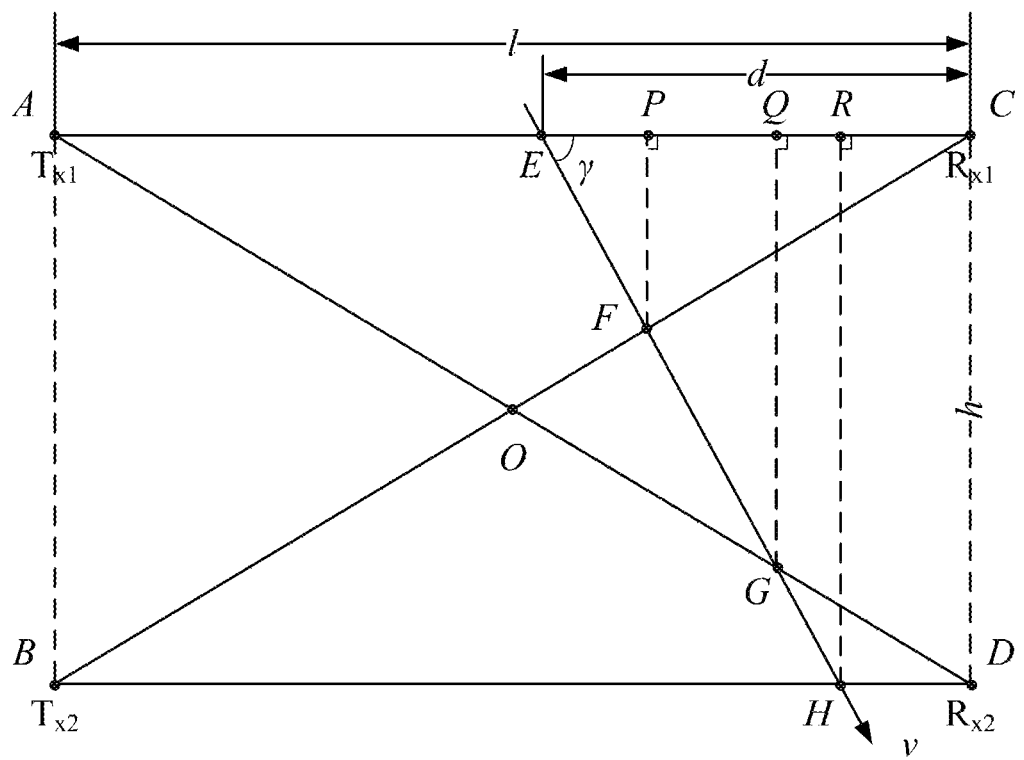
FIG. 3 shows a schematic diagram of a forward acoustic scattering based double-transmitter double-receiver detection network (rectangle layout-crossing case 1)

When $\alpha=90°$, a parallelogram layout shown in FIG. 1 is simplified as a rectangle layout shown in FIG. 3. In this case, a calculation formula of the target distance d, the inclined angle $\gamma$ of the track and the moving velocity v can be simplified as follows:

$$d = \frac{\Delta t_{21}(\Delta t_{21}+\Delta t_{32}-\Delta t_{43})}{\Delta t_{32}(\Delta t_{21}+\Delta t_{32}+\Delta t_{43})}l, \quad (15)$$

$$\gamma = \tan^{-1}\left(\frac{h}{l}\frac{\Delta t_{32}}{\Delta t_{21}-\Delta t_{43}}\right), \quad (16)$$

$$v = \frac{\sqrt{\Delta t_{32}^2 h^2 + (\Delta t_{21}-\Delta t_{43})^2 l^2}}{\Delta t_{32}(\Delta t_{21}+\Delta t_{32}+\Delta t_{43})}. \quad (17)$$

Figure 4:
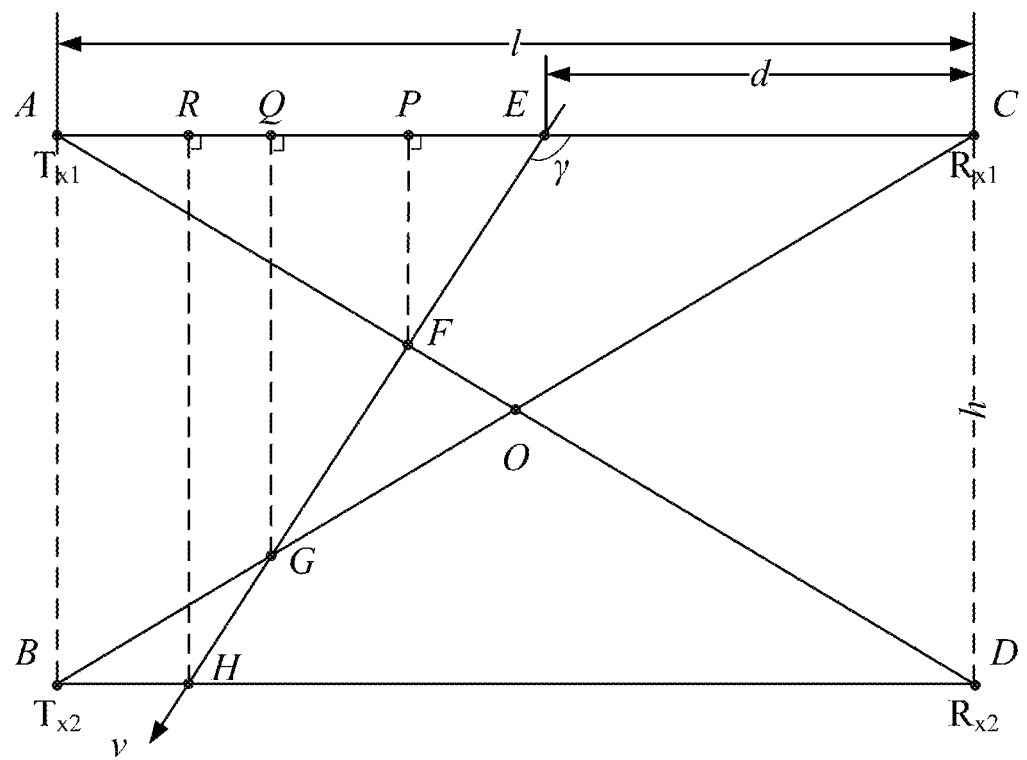
FIG. 4 shows a schematic diagram of a forward acoustic scattering based double-transmitter double-receiver detection network (rectangle layout-crossing case 2).

When $\alpha=90°$, a parallelogram layout shown in FIG. 2 is simplified as a rectangle layout shown in FIG. 4. In this case, a calculation formula of the target distance d, the inclined angle $\gamma$ of the track and the moving velocity v can be simplified as follows:

$$d = -\frac{(\Delta t_{21}+\Delta t_{32})(\Delta t_{21}-\Delta t_{32}-\Delta t_{43})}{\Delta t_{32}(\Delta t_{21}+\Delta t_{32}+\Delta t_{43})}l, \quad (18)$$

$$\gamma = \tan^{-1}\left(\frac{h}{l}\frac{\Delta t_{32}}{\Delta t_{43}-\Delta t_{21}}\right), \quad (19)$$

$$v = \frac{\sqrt{\Delta t_{32}^2 h^2 + (\Delta t_{43}-\Delta t_{21})^2 l^2}}{\Delta t_{32}(\Delta t_{21}+\Delta t_{32}+\Delta t_{43})}. \quad (20)$$

An application example is given in a second part. Firstly, FIG. 1 is taken as an example for description. It is assumed that l=1000 m, h=500 m and $\alpha=60°$. The target successively crosses the transmitting-receiving connection lines of AC, BC, AD and BD at a velocity v=2.5 m/s along a straight line; a horizontal distance from the crossing point on AC to point C is d=500 m; and the inclined angle $\gamma$ of the track is 80°. Relative to a certain reference time (t=0), four crossing time extracted by a direct wave suppression method are respectively $t_1=100$ s, $t_2=166.3$ s, $t_3=230.6$ s and $t_4=275.9$ s. Then, moving time intervals are calculated: $t_{21}=66.3$ s, $t_{32}=64.3$ s and $t_{43}=45.3$ s. Related parameters are successively substituted into formula (3), formula (4) and formula (7) to obtain the following estimated values: $d\approx499.7$ m, $\gamma\approx80.03°$, and $v\approx2.49$ m/s.

Taking FIG. 2 as an example, it is assumed that l=1000 m, h=500 m and $\alpha=60°$. The target successively crosses the transmitting-receiving connection lines of AC, AD, BC and BD at a velocity v=2.5 m/s along a straight line; a horizontal distance from the crossing point on AC to point C is d=500 m; and the inclined angle $\gamma$ of the track is 133°. Relative to a certain reference time (t=0), four crossing time extracted by a direct wave suppression method are respectively $t_1=100$ s, $t_2=202.6$ s, $t_3=240$ s and $t_4=336.8$ s. Then, moving time intervals are calculated: $t_{21}=102.6$ s, $t_{32}=37.4$ s and $t_{43}=96.8$ s. Related parameters are successively substituted into formula (10), formula (11) and formula (14) to obtain the following estimated values: $d\approx499.3$ m, $\gamma\approx133.1°$ and $v\approx2.50$ m/s.

The direct wave suppression method in the present embodiment adopts the direct wave suppression method based on adaptive interference cancellation proposed in patent ZL201418002697.7 to extract the time of the target crossing the transmitting-receiving connection lines.

The present invention obtains obvious implementation effects in typical embodiments. The forward acoustic scattering based double-transmitter double-receiver networking target detection method is convenient in operation, and simple in algorithm, has good robustness, can be used for detecting underwater targets in important ports, sea channels, straits and the like, and has wide application prospect.

What is claimed is:

1. A method for detection by using a forward acoustic scattering based double-transmitter and double-receiver networking target detection system, wherein the forward acoustic scattering based double-transmitter and double-receiver networking target detection system comprises two transmitting ends and two receiving ends anchored at a sea bottom and formed in a parallelogram layout, the two transmitting ends are respectively marked as $T_{x1}$ and $T_{x2}$; the two receiving ends are respectively marked as $R_{x1}$ and $R_{x2}$; $T_{x1}$-$R_{x1}$, $R_{x1}$-$R_{x2}$, $R_{x2}$-$T_{x2}$ and $T_{x2}$-$T_{x1}$ form four edges of the parallelogram; $T_{x1}$-$R_{x2}$ and $T_{x2}$-$R_{x1}$ are two diagonal lines of the parallelogram; a length of $T_{x1}$-$R_{x1}$ is marked as l; a length of $R_{x1}$-$R_{x2}$ is marked as h; an included angle between $T_{x1}$-$T_{x2}$ and $T_{x2}$-$R_{x2}$ is marked as $\alpha$; and four transmitting-receiving connection lines are formed: $T_{x1}$-$R_{x1}$, $T_{x1}$-$R_{x2}$, $T_{x2}$-$R_{x1}$ and $T_{x2}$-$R_{x2}$; and depths of the transmitting ends and the receiving ends are equal, the method comprises following steps of estimating unknown parameters of d, v and $\gamma$ when a target successively crosses $T_{x1}$-$R_{x1}$, $T_{x2}$-$R_{x1}$, $T_{x1}$-$R_{x2}$ and $T_{x2}$-$R_{x2}$ at uniform velocity v along a straight line, with a horizontal distance from a crossing point of the target on the transmitting-receiving connection line $T_{x1}$-$R_{x1}$ to $R_{x1}$ marked as d and an included angle between a target track and the transmitting-receiving connection line $T_{x1}$-$R_{x1}$ marked as $\gamma$:

step 1: extracting time of the target crossing transmitting-receiving connection lines by adopting a direct wave suppression method, wherein since four transmitting-receiving connection lines exist under a double-transmitter and double-receiver configuration, four time are successively marked as $t_1$, $t_2$, $t_3$ and $t_4$ according to a time sequence;

step 2: calculating corresponding moving time intervals when the target crosses the four transmitting-receiving connection lines as $\Delta t_{21}=t_2-t_1$, $\Delta t_{32}=t_3-t_2$ and $\Delta t_{43}=t_4-t_3$;

step 3: substituting parameters of $\Delta t_{21}$, $\Delta t_{32}$, $\Delta t_{43}$ and l into the following formula to obtain an estimated value of a target distance d:

$$d = \frac{\Delta t_{21}(\Delta t_{21} + \Delta t_{32} - \Delta t_{43})}{\Delta t_{32}(\Delta t_{32} + \Delta t_{43})} l$$

wherein l is a length of $T_{x1}$-$R_{x1}$;

step 4: substituting parameters of $\Delta t_{21}, \Delta t_{32}$, $\Delta t_{43}$, l, h and α into the following formula to obtain an estimated value of an inclined angle α of a target track:

$$\gamma = \tan^{-1}\left(\frac{1}{\frac{l}{h\sin\alpha}\frac{\Delta t_{21} - \Delta t_{43}}{\Delta t_{32}} - \frac{1}{\tan\alpha}}\right)$$

wherein h is a length of $R_{x1}$-$R_{x2}$ and α is an included angle between $T_{x1}$-$T_{x2}$ and $T_{x2}$-$R_{x2}$; and step 5: substituting parameters of $\Delta t_{21}, \Delta t_{32}$, $\Delta t_{43}$, l, h and α into the following formula to obtain an estimated value of a moving velocity v of the target:

$$v = \frac{\sqrt{h^2 \Delta t_{32}^2 \sin^2\alpha + [l(\Delta t_{21} - \Delta t_{43}) - h\Delta t_{32}\cos\alpha]^2}}{\Delta t_{32}(\Delta t_{21} + \Delta t_{32} + \Delta t_{43})}.$$

2. A method for detection by using a forward acoustic scattering based double-transmitter and double-receiver networking target detection system, wherein the forward acoustic scattering based double-transmitter and double-receiver networking target detection system comprises two transmitting ends and two receiving ends anchored at a sea bottom and formed in a parallelogram layout, the two transmitting ends are respectively marked as $T_{x1}$ and $T_{x2}$; the two receiving ends are respectively marked as $R_{x1}$ and $R_{x2}$; $T_{x1}$-$R_{x1}$, $R_{x1}$-$R_{x2}$, $R_{x2}$-$T_{x2}$ and $T_{x2}$-$T_{x1}$ form four edges of the parallelogram; $T_{x1}$-$R_{x2}$ and $T_{x2}$-$R_{x1}$ are two diagonal lines of the parallelogram; a length of $T_{x1}$-$R_{x1}$ is marked as e; a length of $R_{x1}$-$R_{x2}$ is marked as h; an included angle between $T_{x1}$-$T_{x2}$ and $T_{x2}$-$R_{x2}$ is marked as α; and four transmitting-receiving connection lines are formed: $T_{x1}$-$R_{x1}$, $T_{x1}$-$R_{x2}$, $T_{x2}$-$R_{x1}$ and $T_{x2}$-$R_{x2}$; and depths of the transmitting ends and the receiving ends are equal, wherein the method comprises the following steps of estimating unknown parameters of d, v and γ when a target successively crosses $T_{x1}$-$R_{x1}$, $T_{x1}$-$R_{x2}$, $T_{x2}$-$R_{x1}$ and $T_{x2}$-$R_{x2}$ at uniform velocity v along a straight line, with a horizontal distance from a crossing point of the target on the transmitting-receiving connection line $T_{x1}$-$R_{x1}$ to $R_{x1}$ marked as d and an included angle between a target track and the transmitting-receiving connection line $T_{x1}$-$R_{x1}$ marked as γ:

step 1: extracting time of the target crossing transmitting-receiving connection lines by adopting a direct wave suppression method, wherein since four transmitting-receiving connection lines exist under a double-transmitter double-receiver configuration, four time are successively marked as $t_1$, $t_2$, $t_3$ and $t_4$ according to a time sequence;

step 2: calculating corresponding moving time intervals when the target crosses the four transmitting-receiving connection lines as $\Delta t_{21}=t_2-t_1$, $\Delta t_{32}=t_3-t_2$ and $\Delta t_{43}=t_4-t_3$;

step 3: substituting parameters of $\Delta t_{21}$, $\Delta t_{32}$, $\Delta t_{43}$ and l into the following formula to obtain an estimated value of a target distance d:

$$d = -\frac{(\Delta t_{21} + \Delta t_{32})(\Delta t_{21} - \Delta t_{32} - \Delta t_{43})}{\Delta t_{32}(\Delta t_{21} + \Delta t_{32} + \Delta t_{43})} l$$

wherein l is a length of $T_{x1}$-$R_{x1}$;

step 4: substituting parameters of $\Delta t_{21}$, $\Delta t_{32}$, $\Delta t_{43}$, l, h and α into the following formula to obtain an estimated value of an inclined angle α of a target track:

$$\gamma = \tan^{-1}\left(\frac{1}{\frac{l}{h\sin\alpha}\frac{\Delta t_{43} - \Delta t_{21}}{\Delta t_{32}} - \frac{1}{\tan\alpha}}\right)$$

wherein h is a length of $R_{x1}$-$R_{x2}$ and α is an included angle between $T_{x1}$-$T_{x2}$ and $T_{x2}$-$R_{x2}$; and step 5: substituting parameters of $\Delta t_{21}$, $\Delta t_{32}$, $\Delta t_{43}$, l, h and α into the following formula to obtain an estimated value of a moving velocity v of the target:

$$v = \frac{\sqrt{h^2 \Delta t_{32}^2 \sin^2\alpha + [l(\Delta t_{43} - \Delta t_{21}) - h\Delta t_{32}\cos\alpha]^2}}{\Delta t_{32}(\Delta t_{21} + \Delta t_{32} + \Delta t_{43})}.$$

* * * * *